(12) United States Patent
Lohn

(10) Patent No.: US 6,901,735 B2
(45) Date of Patent: Jun. 7, 2005

(54) MODULAR FUEL CONDITIONING SYSTEM

(75) Inventor: Paul Lohn, The Woodlands, TX (US)

(73) Assignee: Pipeline Controls, Inc., Houston, TX (US)

( * ) Notice: Subject to any disclaimer, the term of this patent is extended or adjusted under 35 U.S.C. 154(b) by 246 days.

(21) Appl. No.: 10/210,352

(22) Filed: Aug. 1, 2002

(65) Prior Publication Data

US 2003/0056514 A1 Mar. 27, 2003

Related U.S. Application Data

(60) Provisional application No. 60/309,413, filed on Aug. 1, 2001.

(51) Int. Cl.[7] ................................................ F02C 3/22
(52) U.S. Cl. ..................................... 60/39.465; 60/736
(58) Field of Search ........................ 60/39.281, 39.465, 60/734, 736

(56) References Cited

U.S. PATENT DOCUMENTS

| | | | |
|---|---|---|---|
| 3,261,762 A | 7/1966 | Knapp | |
| 3,552,134 A | 1/1971 | Arenson | |
| 4,584,871 A | 4/1986 | Lohn | |
| 4,633,911 A | 1/1987 | Lohn | |
| 4,922,710 A | * 5/1990 | Rowen et al. | 60/39.281 |
| 5,606,853 A | * 3/1997 | Birch et al. | 60/39.281 |
| 5,609,016 A | 3/1997 | Yamada et al. | |
| 5,899,073 A | 5/1999 | Akimaru | |
| 6,082,092 A | 7/2000 | Vandervort | |
| 6,167,692 B1 | 1/2001 | Anand et al. | |
| 6,401,459 B1 | 6/2002 | Tiras | |

OTHER PUBLICATIONS

Proposal dated Apr. 21, 2000 to Pinnacle Natural Gas Company.
Process Specification—Fuel Gases for Combustion in Heavy–Duty Gas Turbines, by G.E. Power Systems, GEI4104F, Revised, Jan. 1999.

* cited by examiner

Primary Examiner—Louis J. Casaregola
(74) Attorney, Agent, or Firm—Bracewell & Patterson, L.L.P.

(57) ABSTRACT

A fuel conditioning system for a turbine plant may include an inlet fuel module followed by a turbine fuel module for each turbine, the modules being monitored and controlled by a programmable logic controller. The inlet fuel module may include a metering station, an inlet pressure control station, an inlet scrubber station, and an inlet coalescing filter station. Each turbine fuel module has a turbine pressure control station, a turbine super-heater station, and a turbine coalescing filter station. The fuel conditioning system may also include a trip transient mitigation system and a latent fuel venting system. The programmable logic controller collects data from all of the stations and systems as well as the turbine and then uses self-correcting algorithms to control the stations and systems. The programmable logic controller also stores the data collected and transmits the data to an off-site storage and verification center.

25 Claims, 7 Drawing Sheets

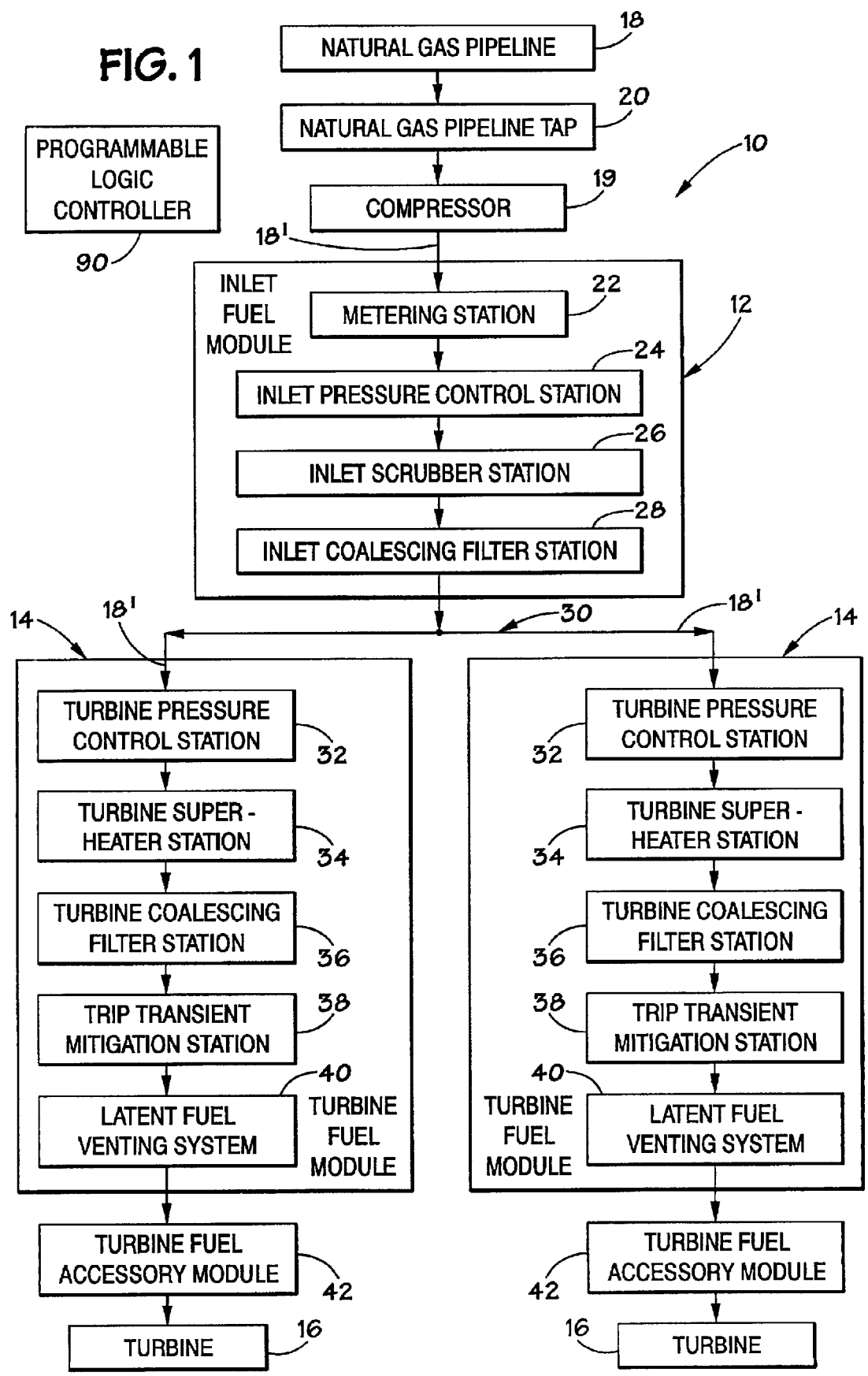

MODULAR FUEL CONDITIONING SYSTEM

RELATED APPLICATION

This application claims the benefit of U.S. Provisional Patent Application Serial No. 60/309,413, filed Aug. 1, 2001, entitled "Modular Fuel Conditioning System".

BACKGROUND OF THE INVENTION

1. Field of the Invention

The present invention relates generally to fuel conditioning systems. More specifically, the present invention relates to fuel conditioning systems for natural gas fuel powered turbines.

2. Description of the Related Art

In the field of natural gas fuel powered turbines, the manufacturers of the turbines put very strict restrictions upon the quality of the fuel that can be used with their turbines. In some countries the fuel, provided from a pipeline supplying the turbine with fuel, does not comply with these restrictions. The fuel from the pipeline is typically at a higher pressure than that needed by the turbine with a tendency for variations in pressure. The fuel may also contain various contaminants such as moisture, liquid hydrocarbons, particulates and other liquids. The manufacturers have restricted the permissible amounts of various contaminants, put limits on other fuel parameters, and put limits on the rate of change of those parameters within the allowed range. The importance of these restrictions is typically found in the warranty provisions for the turbine unit. The manufacturer's warranty for a large natural gas fuel-powered turbine is typically voided, if fuel is used that does not meet the manufacturer's fuel requirements.

As environmental concerns have led turbine manufacturers to maximize their turbine designs to increase efficiency, the requirements for the fuel used in these turbines have also increased. In order to produce the same energy with less pollution, the fuel must be thoroughly conditioned prior to entering the turbine. Impurities should be removed, the pressure of the fuel should be controlled, and the fuel should be heated, to seek to prevent liquids from forming and from entering the combustion area, or combustor section, of the turbine. Furthermore, there must not be rapid changes of the values of any parameter, even within the acceptable ranges. Therefore, not only should the pressure be limited to a restricted range of values, but the maximum rate of change in pressure should also be limited. The same requirements are true for the temperature of the natural gas fuel. By doing so, optimum turbine operation, safety, and emissions performance may be achieved.

Various systems have been proposed to condition the fuel provided from a natural gas pipeline for use in a natural gas fuel powered turbine. In one system the fuel is filtered and then heated. The heater's output is adjusted based upon the saturation temperature of the fuel gas. Another system proposes a pressure relief system that stores pressure values for comparison. This system is intended to control rapid changes in pressure by comparing values over a short period of time. This system is designed to prevent pressure surges that may damage a turbine. None of these prior systems is believed to consistently meet all of the criteria set by turbine manufacturers. These prior systems attempt to deal with only one criteria, not the overall conditioning of the fuel.

It would be advantageous to have a system that could monitor and control all of the important fuel characteristics to properly condition the fuel to meet the demands of each turbine in a set of turbines. It would also be advantageous to have a verification system that could assist the operator in proving that the fuel provided to the turbine was within the parameters specified by the turbine's manufacturer, in order to assist a turbine operator in processing warranty claims.

BRIEF SUMMARY OF THE INVENTION

In accordance with the present invention, a modular fuel conditioning system includes an inlet fuel module, turbine fuel modules, turbine fuel accessory modules and a programmable logic controller. The fuel conditioning system is designed to provide fuel from a pipeline to a turbine plant having several individual natural gas powered turbines.

The inlet fuel module treats the fuel as it is received from the pipeline for a set of turbines in the turbine plant. The inlet fuel module of the preferred embodiment may include: a metering station; inlet pressure control station; an inlet scrubber station; and an inlet filter station. The metering station is comprised mainly of fuel monitoring equipment to tell the pipeline operator and the operator of the turbine plant how much fuel has been received by the turbine plant. The inlet pressure control station may have pressure monitoring equipment along with regulating valves to reduce the pressure of the natural gas fuel provided by the pipeline. The inlet scrubber station may have a vertical centrifugal scrubber for removing primarily liquids from the fuel. The scrubber may have a waste system with monitors to record the amount of liquid being removed from the fuel. The inlet filter station may have an inlet coalescing filter that removes aerosols and particulates from the natural gas fuel provided by the pipeline.

After the fuel has been treated by the inlet fuel module, the fuel is distributed to the turbine fuel modules. There is a turbine fuel module for each turbine. While the system of the present invention may be used for each individual turbine, the efficiencies of the modular design are fully realized when the inlet fuel module feeds into two or more parallel turbine fuel modules, each turbine fuel module feeding into its own associated turbine. The turbine fuel module may include: a turbine pressure control station; a turbine super-heater station; a turbine coalescing filter station; and a trip transient mitigation system. The turbine pressure control station may have fuel pressure monitoring instruments and pressure regulating equipment to further control the pressure of the fuel. The turbine super-heater station may have fuel monitoring instruments to determine the dew point of both the moisture and the hydrocarbons in the natural gas fuel. The super-heater station may also have a heater to heat the natural gas fuel to a temperature in excess of the dew points determined. The turbine coalescing filter station may have a reverse flow coalescing filter and monitoring instruments that monitor the waste from the coalescing filter. The trip transient system may have a surge vent valve that is activated prior to a turbine trip so that the trip does not create a high pressure system at another turbine in the turbine plant.

Both the inlet fuel module and the turbine fuel module are thoroughly monitored and controlled by the programmable logic controller. The programmable logic controller may be connected to all of the monitoring instruments and all of the control valves in the system, including the turbine itself. The programmable logic controller may use self-correcting algorithms to constantly optimize the fuel supply for each particular turbine. The programmable logic controller allows the fuel conditioning system more control over small changes in the fuel supply, rather than simply reacting to surges and large changes in the fuel supply. Furthermore, the programmable logic controller may be connected to both a recording device and a transmitting device. These connections allow all of the data collected about the incoming fuel, the fuel as it is treated, and the fuel as it is delivered to the turbine to be monitored by the plant operator and simultaneously sent to the turbine manufacturer to verify compliance with warranty terms.

Another feature of the present invention is the latent fuel conditioning system. It is common for one of the turbine in a turbine plant to shut down during non-peak times. When the turbine is not running, the fuel in pipes between the super-heater station and the turbine will tend to cool. This cooling may allow liquids, such as water, to form in the fuel that would damage the turbine. Therefore, the latent fuel conditioning system monitors the temperature of fuel in the pipes and provides a recycle system which allows the latent fuel to be recycled back through the fuel piping system from the combustion turbine fuel module inlet, back to the super-heater station and then recycled back to the turbine fuel module as heated fuel. In this design another feature is provided on specific turbine fuel systems, which require compression due to low pipeline pressure. The invention provides specifically designed compressor stations and controls which use the heat of compression from the compressor to heat the fuel for control of superheat in the fuel gas system. The described recycle fuel system is also incorporated in systems with compression. The system also provides vents to allow fuel gas pressure to be lowered if the fuel temperature approaches the dew point of fuel gas. The venting system allows fuel gas pressure to be decreased, thereby reducing the dew point of the fuel gas. By venting the fuel the pressure is decreased, thereby reducing the dew point, and allowing space for freshly heated fuel to enter the pipes if necessary. In the preferred embodiment the vented fuel is captured and used by the heaters in the super-heater stations as a heating fuel.

The fuel conditioning system of the present invention is believed to provide complete conditioning of natural gas fuel provided by a pipeline for use in natural gas fuel powered turbines, while continuously reacting to changing conditions in the fuel and in the turbines, and recording the fuel conditioning to provide verification for warranty and maintenance purposes.

BRIEF DESCRIPTION OF THE DRAWING

FIG. 1 is a schematic flow diagram of a fuel conditioning system in accordance with this invention;

Figure 2A:
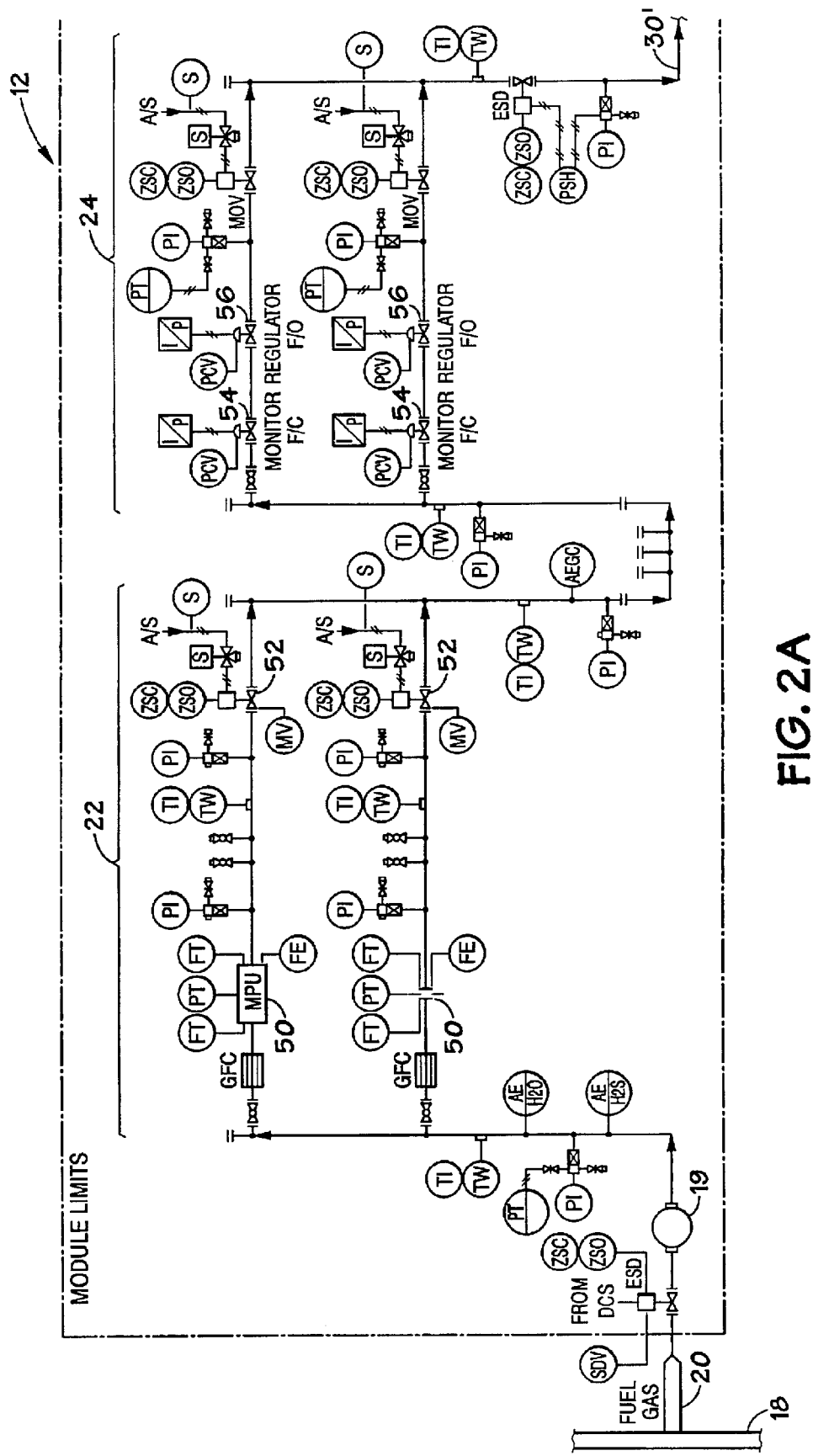
FIG. 2 is a schematic flow diagram of the inlet fuel module of the fuel conditioning system of FIG. 1.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

Referring to FIG. 1, the preferred embodiment of the fuel conditioning system 10 of the present invention has a modular design that includes an inlet fuel module 12 for the turbine plant, and a turbine fuel module 14 for each conventional turbine 16. The inlet fuel module 12 receives natural gas fuel from a conventional pressurized natural gas pipeline 18 via a conventional pipeline tap 20 provided by the operator of the pipeline. From the pipeline tap 20, the natural gas fuel 18' travels, or flows, into the metering station 22 within the inlet fuel module 12, and the metering station 22 measures the amount of fuel received from the pipeline 18. From the metering station 22, the fuel then flows into the inlet pressure control station 24, which reduces the pressure of the fuel received from the pipeline 20. The fuel is then received by the inlet scrubber station 26, which removes liquids from the fuel. The fuel that leaves the inlet scrubber station 26 then flows into the inlet coalescing filter station 28, where aerosols and particulates may be removed. All of the above fuel conditioning steps preferably occur in the components of the inlet fuel module 12, as will be hereinafter discussed in more detail.

Still with reference to FIG. 1, as the fuel 18' leaves the inlet fuel module 12, it travels through a distribution system inlet fuel 30 to a turbine fuel module 14. The distribution system 30 inlet fuel, which may be comprised of conventional piping, in fluid communication with the inlet fuel module 12, connects at least one, and up to several turbine fuel modules 14 to the inlet fuel module 12. The turbine fuel modules 14 are provided so that there is preferably one turbine fuel module 14 for each turbine 16. This allows the turbine fuel module 14 to be fine tuned to meet the needs of the particular turbine 16 with which it is associated. FIG. 1, which may be comprised of conventional piping, shows a fuel conditioning system 10 where the inlet fuel module 12 treats fuel for two turbines 16, whereby the distribution system 30 delivers fuel to two turbine fuel modules 14. Of course, as many turbines 16 could be utilized as desired for a given turbine plant, and preferably a turbine fuel module is provided for each turbine 16. In the embodiment illustrated the turbine fuel modules 14 are identical in structure, although only one is shown in relative detail. The turbine fuel module 14 has a turbine pressure control station 32 to further regulate the pressure of the fuel. The fuel 18' next enters a turbine super-heater station 34 which determines the dew points of moisture and hydrocarbons in the fuel and then heats the fuel above these dew points. The moisture and hydrocarbons are then evaporated, so that liquids are prevented from entering the turbine 16. After being heated, the fuel passes through the turbine coalescing filter station 36 to remove any remaining aerosols or particulates prior to entering the turbine 16. The turbine fuel module 14 of the preferred embodiment may also include a trip transient system 38 that prevents a turbine 14 being shut down from sending a pressure wave to other turbines 14, thus causing the other turbines 14 to shut down. The preferred embodiment of the turbine fuel module 14 may also include a latent fuel venting system 40 that vents fuel that is trapped between the turbine super-heater station 34 and the turbine 16, so that it does not cool and allow liquids to form while the turbine 16 is out of service. Also shown in FIG. 1 is a turbine fuel accessory module 42, as will be hereafter discussed in more detail.

Figure 2B:
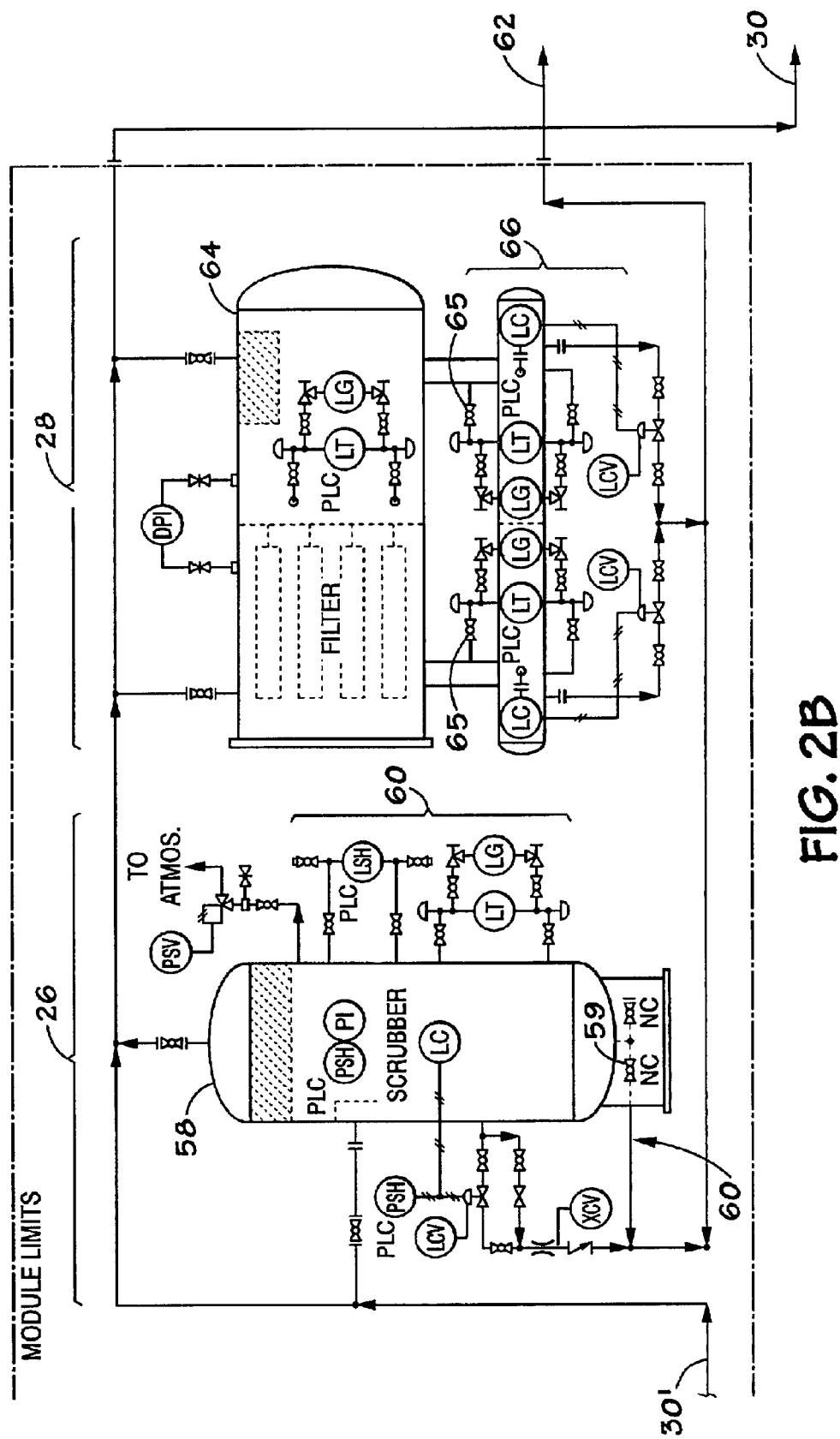

With reference to FIG. 2, the metering station 22 of inlet fuel module 12 may include conventional fuel monitoring instruments 50 and conventional fuel metering devices 52, such as a ultrasonic, orifice, and/or turbine type meters. The fuel then passes, or flows, to the inlet pressure control station 24 which includes a conventional pressure monitor 54 and a conventional pressure regulator 56. The preferred embodiment shows a parallel system that provides operational flexibility and reduces downtime. Thus, at least two sets of components, such as monitors 50 and 54, metering devices 52 and regulators 56, are provided for parallel operation, whereby if one set of components suffers a failure or needs to be serviced, the other parallel set of components may function and permit continued operation of the turbine plant. The gas is piped, as by conventional piping 30', of distribution system 30, from the inlet pressure control station 24 to the inlet scrubber station 26. The inlet scrubber station 26 may include a vertical centrifugal scrubber 58 with a waste monitoring and disposal system 60. The scrubber 58, including at least one drain tank (not shown), is designed to remove liquids from the natural gas fuel while the waste monitoring and disposal system 60 monitors the volume of liquids removed and directs the removed liquids to a waste storage site 62 for later removal. The fuel is fed from the inlet scrubber station 26 to the inlet coalescing filter station 28. The inlet coalescing filter station 28 may have a reverse flow coalescing filter 64 and a waste monitoring and disposal system 66. The coalescing filter 64 is designed to remove aerosols and particulates from the fuel. The waste monitoring and disposal system 66 monitors the aerosols and particulates removed by the filter 64 and then directs the removed aerosols and particulates to a waste storage site 62 for later removal. Other types of filters, as are known in the art, may be utilized in filter station 28, if desired.

As shown schematically in FIG. 1, the fuel treated by the inlet fuel module 12 is received in the distribution system 30 for distribution to the one, or more, turbine fuel modules 14. One such turbine fuel module 14 is shown in greater detail in FIG. 3. The natural gas fuel is received from the distribution system 30 into the turbine pressure control station 32. The turbine pressure control station 32 further limits the pressure of the natural gas fuel while also limiting pressure gradients in the natural gas fuel. The turbine pressure control station 32 includes conventional fast response control valves 68 to tailor the pressure to meet the demands of each turbine 16. Again, duplicate components, such as valve 68 operating parallel to each other, are provided for operational flexibility and to reduce downtime during repairs and maintenance.

The fuel from the turbine pressure control station 32 is fed to the turbine super-heat station 34. The turbine super-heat station 34 includes conventional monitoring equipment 70 to determine the dew point of both moisture and hydrocarbons in the fuel. In the preferred embodiment, gas chromatographs and analysis systems are provided to provide real time analysis of the hydrocarbon dew point and the moisture dew point of the fuel. The super-heat station 34 may also include a gas super-heater 72 that heats the fuel to a temperature above the measured dew points as the gas 18' passes through the vessel 73 of super-heater 72. The heater of the preferred embodiment has a conventional, natural gas fuel powered burner 74. The super-heat station 34 may also include conventional measuring instruments 76 and mixing valves 78 to mix the heated fuel with cooler fuel, as hereinafter discussed in more detail.

Figure 3A:
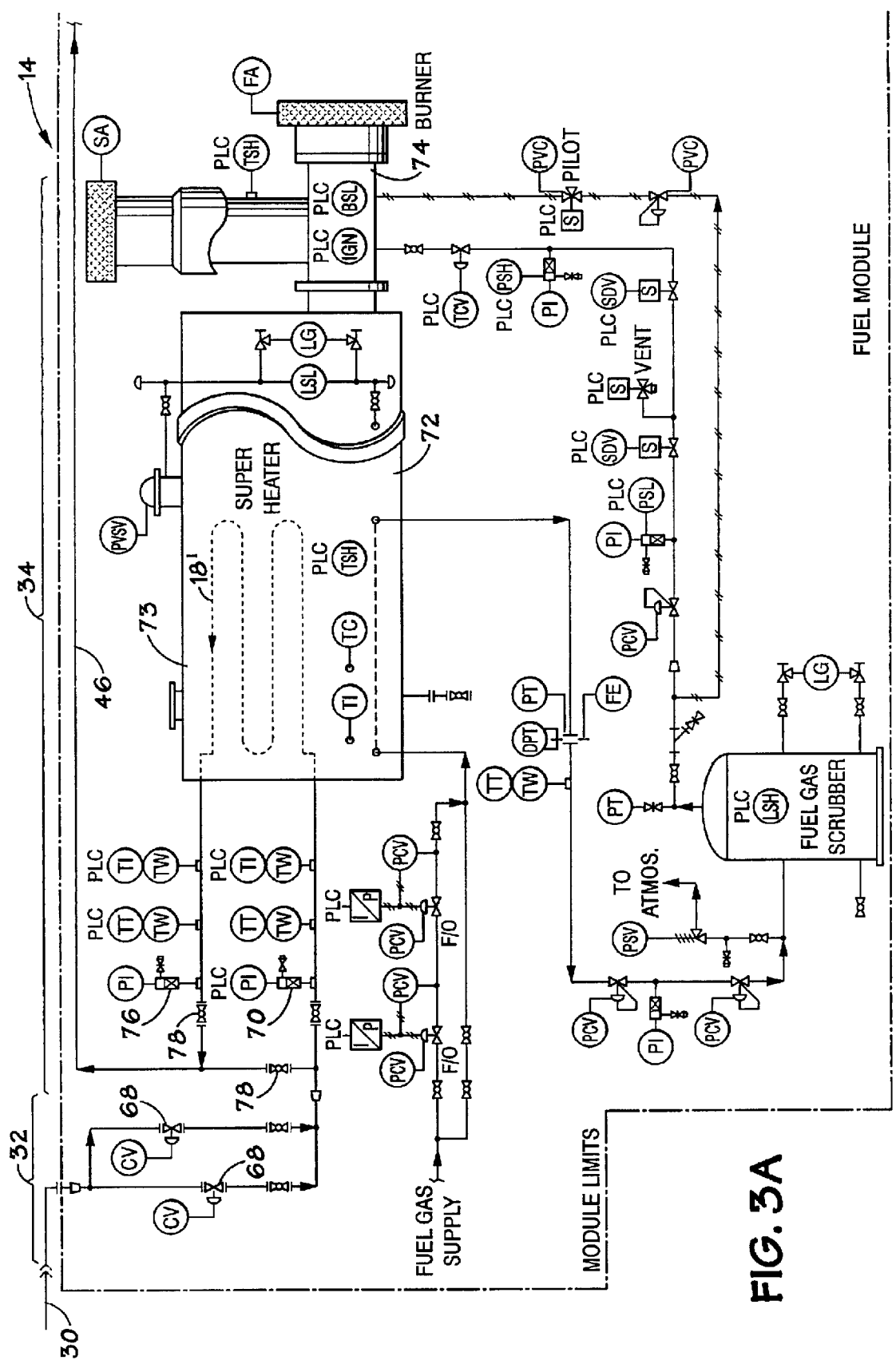
FIG. 3 is a schematic flow diagram of the turbine fuel module of the fuel conditioning system of FIG. 1.
Figure 3B:
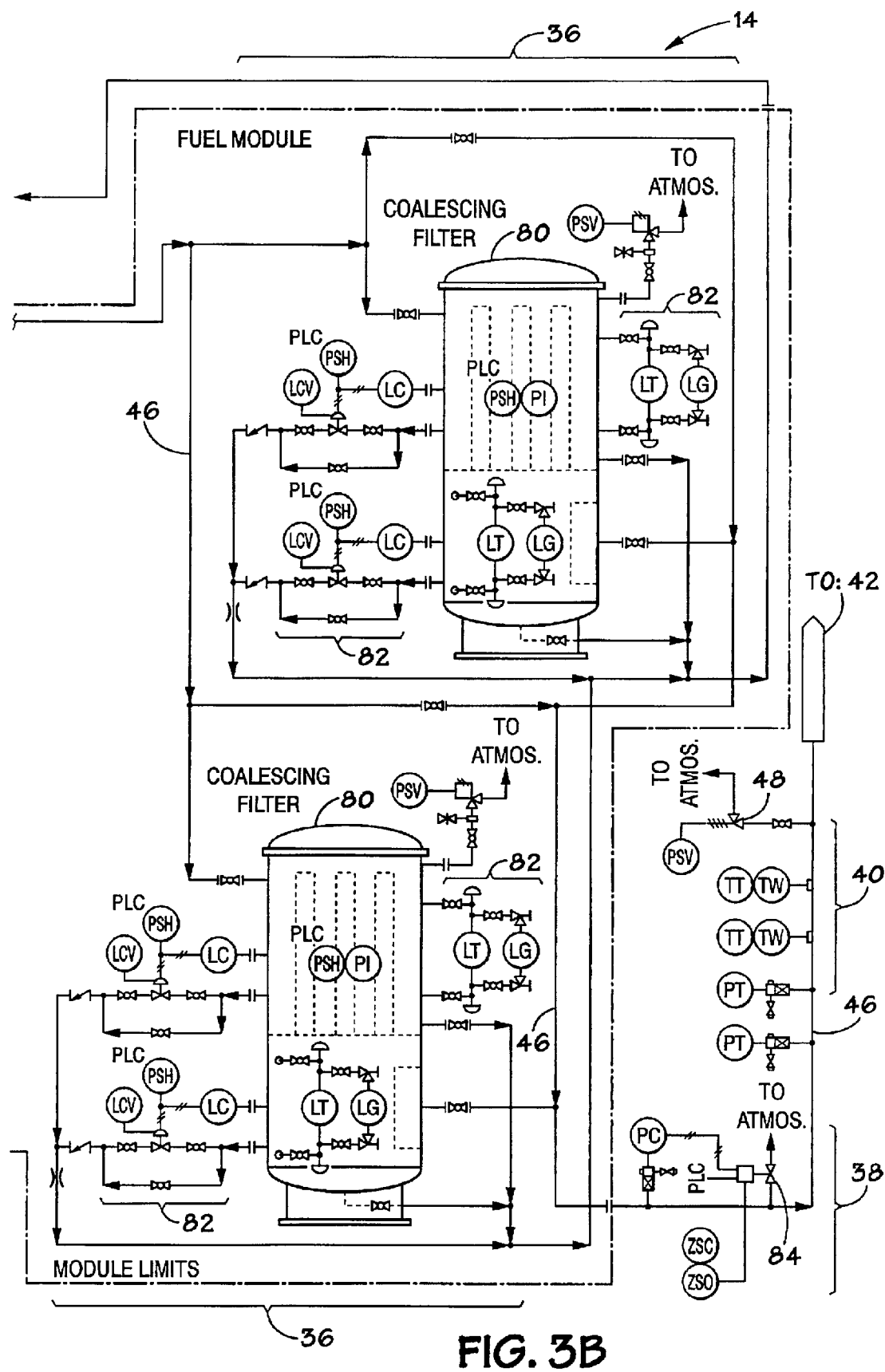

Referring to FIG. 3, the fuel from the super-heat station 34 then flows into the turbine coalescing filter station 36. The turbine coalescing filter station 36 may include at least one reverse flow coalescing filter 80. The preferred embodiment shown in FIG. 3 shows two reverse flow coalescing filters 80 running in parallel to provide operational flexibility and reduce downtime, so that one filter 80 may be repaired or maintained while the other filter 80 is operating. Each reverse coalescing filter 80 may be paired to a waste monitoring and disposal system 82 similar to system 60 previously described. The reverse coalescing filters 80 are designed to remove aerosols and particulates remaining in the natural gas fuel. Other types of filters, if desired, may be utilized.

As shown in FIG. 1, the turbine fuel module may include a trip transient mitigation system 38. The trip transient mitigation system 38 includes a trip surge vent valve 84, so that when a turbine 16 is brought off line suddenly, or tripped, the pressure surge from the trip does not propagate to a nearby turbine 16 causing the nearby turbine 16 to trip as well. The control of the trip transient mitigation system 38 is discussed more fully below.

FIG. 1 also shows a latent fuel venting system 40 which may be associated with the turbine fuel module 14. The latent fuel venting system 40 prevents fuel that is latent in the pipes 46 between the heater 72 and the turbine 16 from cooling to a point at which liquids form while the turbine 16 is not operational. Such cooling can cause liquids to form that may damage the turbine 16 upon start-up. The latent fuel venting system 40 monitors the temperature of the fuel in pipes 46, and as the fuel approaches a temperature at which liquids may form, a vent 48 is activated to vent some fuel from pipes 46. This venting instantaneously reduces the pressure of the fuel thereby increasing the dew points of moisture and hydrocarbons in the fuel. If more venting is required, freshly heated fuel will then replace the vented fuel to bring the fuel in the pipes 46 back up to the needed pressure. The vented fuel may also be routed to the burner 74 through pipes (not shown) to be used as fuel for burner 74. Additionally, the fuel that is latent in pipes 46 may be recycled back to the super-heater 72 of super-heater station 34 via suitable pipes to be reheated and re-circulated as heated fuel, thereby preventing the formation of liquids in the fuel. If the pressure of the pipeline 18 is low, the gas may need to be compressed to obtain the necessary pressure level. The heat of compression from the compressor, or compressors, used to obtain the desired pressure level, may also be utilized to heat the fuel.

Figure 4:
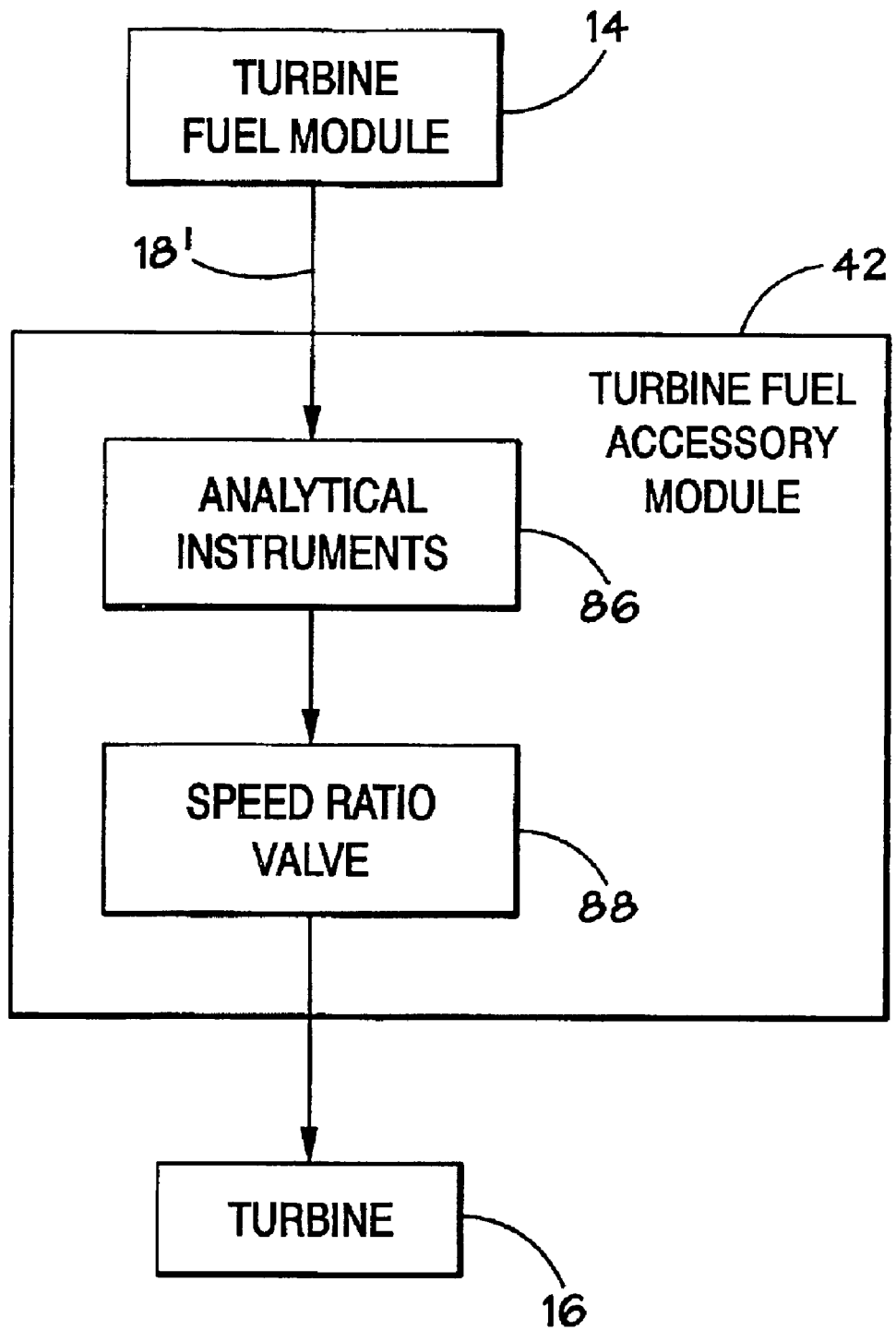
FIG. 4 is a schematic flow diagram of the turbine fuel accessory module of the fuel conditioning system of FIG. 1.

As shown in FIG. 1, once the fuel has passed through the inlet fuel module 12 and the turbine fuel module 14, it may pass through the turbine fuel accessory module 42 just prior to entering the turbine 16. The turbine fuel accessory module 42 is provided by the turbine manufacturer as a part of the turbine package. Its importance to the fuel conditioning system 10 is that the turbine fuel accessory module 42 monitors the fuel and may protect the turbine 16 to some degree. Turning to FIG. 4, the fuel accessory module contains analytical instrumentation 86 and a speed ratio valve 88 that cuts fuel supply to the turbine 16 when the analytical instrumentation 86 detects a fuel condition that could damage the turbine.

Figure 5:
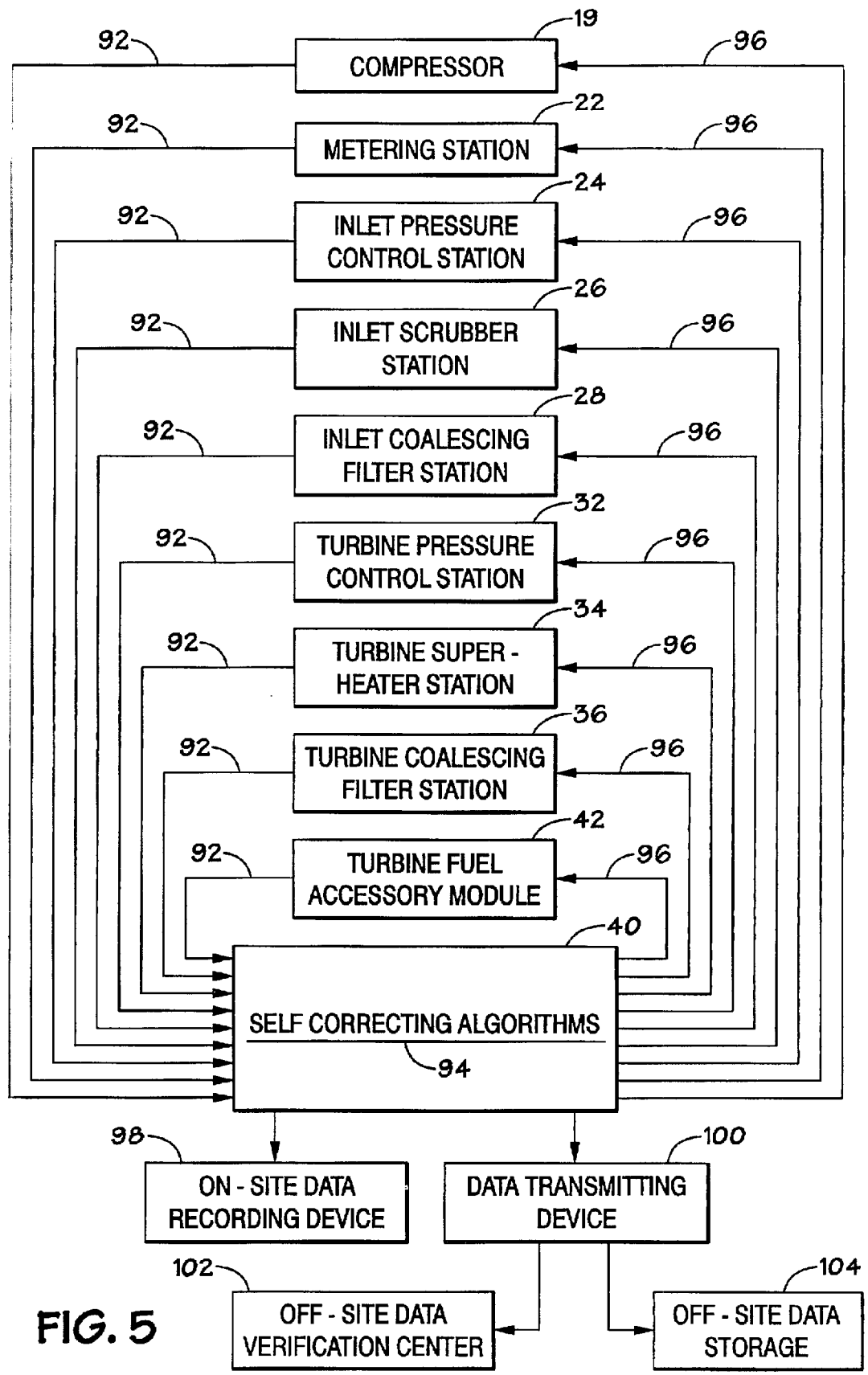
FIG. 5 is a schematic flow diagram of the programmable logic controller of the fuel conditioning system of FIG. 1.

As shown in FIG. 1, the fuel conditioning system 10 may include a programmable logic controller 90, such as an Allen-Bradley brand programmable logic controller from Rockwell Automation, Inc. As shown in FIG. 5, the programmable logic controller 90 is connected to all aspects of the fuel conditioning system 10 to provide integrated monitoring and control of the fuel conditioning system 10. The programmable logic controller 90 receives data 92 from the various instruments throughout the fuel conditioning system 10. The programmable logic controller 90 takes the data 92 received and applies self-correcting algorithms 94 to formulate control commands 96 for the various valves, regulators and devices throughout the fuel conditioning system 10. The programmable logic controller 90 receives data 92 from the inlet pressure control station 24, the turbine pressure control station 32, the fuel accessory module 42 and the turbine 16. Using self correcting algorithms 94 the programmable logic controller 90 sends control commands 96 to the pressure regulators 56 in the inlet pressure control station 24 and the fast response control valves 68 in the turbine pressure control station 32 to provide fuel at a precise pressure that is tailored to the needs of turbine 16. Also using this data 92, the programmable logic controller sends control commands 96 to the pressure regulators 56 and the fast response control valves 68 to reduce changes in pressure received by the fuel accessory module 42 and in turn the turbine 16.

The programmable logic controller 90 is similarly connected to the various monitoring instruments 70, 76 that measure the temperature of the gas and determine the dew points of moisture and hydrocarbons in the gas. The data 92 collected is analyzed by the programmable logic controller 90, using self-correcting algorithms 94 to formulate control commands 96 to send to mixing valves 78 in the turbine super-heater station 34. The commands 96 determine how much cool gas must be mixed with the heated gas both to achieve the optimum temperature and to prevent changes in temperature. Quick changes in temperature, even within the operational range of the turbine 16, can increase turbine emissions and reduce turbine efficiency. Typically, the changes will be kept below two degrees Fahrenheit per second, although stricter requirements would not be unforeseeable.

Another factor that must be controlled is the Modified Wobbe Index, a measurement of the volumetric energy of the fuel. The turbine 16 must have fuel, which has control of Modified Wobbe Index (MWI). MWI is described as follows. While gas turbines can operate with gases having a very wide range of heating values, the amount of variation that a single specific fuel system can accommodate is much less. Variation in heating value, as it affects gas turbine operation, is expressed in a term identified as modified Wobbe Index. This term is a measurement of volumetric energy and is calculated using the Lower Heating Value (LHV) of the fuel, specific gravity [SG] of the fuel with respect to air at ISO conditions, and the fuel temperature. The mathematical definition is as follows:

$$\text{Modified Wobbe Index} = \frac{LHV}{(SG \text{ Gas} \times T)^{1/2}}$$

This is equivalent to: lower heating value of the fuel gas in the numerator, specific gravity of the fuel gas multiplied by temperature—with the product to the one half power (square root) in the denominator. Or as stated below.

$$\text{Modified Wobbe Index} = \frac{LHV}{\frac{(MW \text{ Gas} \times T)^{1/2}}{28.96}}$$

Where:
LHV=Lower Heating value of the Gas Fuel (Btu/scf)
SG gas=Specific Gravity of the Gas Fuel Relative to Air
MW gas=Molecular Weight of the Gas Fuel
T=Absolute Temperature of the Gas Fuel (Rankine)
28.96=Molecular Weight of Dry Air The allowable MWI tolerance range is established to ensure that required combustion turbine fuel nozzle pressure ratios are maintained during all combustion/turbine modes of operation. If MWI is not controlled the combustion turbine will not perform as required. When multiple gas fuels are supplied, and/or if variable fuel temperatures result in a Modified Wobbe Index that exceeds the limitation, turbine revisions are required. The programmable logic controller 90 controls MWI by controlling the valves 78 to input heat to the fuel to trim the MWI to a set point within the tolerance allowed. Using the data 92 collected, along with the self correcting algorithm 94, the programmable logic controller 90 sends control commands 96 to the mixing valves 78 to input heat into the fuel and trim the Modified Wobbe Index to an allowable range.

As previously discussed, the turbine fuel accessory module 42 will detect anomalies in the fuel approaching the turbine 16 and activate a speed ratio valve 88 to shut the fuel supply to the turbine 16. This type of shut down, or trip, creates a pressure surge in the fuel conditioning system 10. Very often the surge in pressure can be enough of an anomaly to cause other turbines 16 on the same fuel conditioning system 10 to trip. The programmable logic controller 90 receives data 92 from the fuel accessory module 42 and is alerted of a trip prior to the speed ratio valve 88 closing. This allows the programmable logic controller 90 to open the surge vent valve 84 of the trip transient mitigation system 38 and release a small amount of pressure to offset the expected surge, thus preventing trips.

As shown in FIG. 5 the programmable logic controller 90 receives data 92 from the various monitors in the fuel conditioning system 10 and uses that data 92 along with self correcting algorithms 94 to send control commands 96. Another important feature of the programmable logic controller 90 is the ability to record the data 92 received in an on-site data storage device 98, such as a conventional personal computer which includes conventional data base software. The programmable logic controller 90 may also include a data transmission device 100 to transmit data 92 to an off-site data storage device 102 or verification center 104. The data 92 is in an electronic format so that the data storage device may include either a magnetic or optical medium, such as a tape drive, hard disc drive, or compact disc drive. The data 92 could also be stored on paper or any other suitable medium. The data 92 can also be transmitted in a variety of manners. The data 92 may be transmitted via telephone lines, coaxial cable, infrared devices, microwave devices, cellular devices, or any other suitable data transmittal medium. Once transmitted, the data 92 may be stored in any suitable medium and analyzed as needed.

It is to be understood that the invention is not limited to the exact details of the construction, operation, exact materials or embodiment shown and described, as obvious modifications and equivalents will be apparent to one skilled in the art. For example, the super-heat station 34 may include a plurality of smaller heaters to provide design or operational flexibility. Accordingly, the invention is therefore to be limited only by the scope of the appended claims.

I claim:

1. A fuel conditioning system for conditioning natural gas fuel provided by a pipeline for use with at least one natural gas fuel powered turbine, comprising:
   an inlet fuel module receiving fuel from the pipeline, the inlet fuel module having a metering station, an inlet pressure control station, an inlet scrubber station, and an inlet filter station, the inlet fuel module metering natural gas fuel flow from the pipeline, controlling the pressure of the natural gas fuel from the pipeline and filtering the natural gas fuel from the pipeline;
   a turbine fuel module for at least one turbine, the tuTtbine control module having a turbine pressure control station to control the pressure of the fuel, a turbine super-heater station to heat the fuel, and a turbine filter station to filter the fuel, the turbine fuel module receiving fuel from the inlet fuel module; and a programmable logic controller for collecting data from the inlet fuel module and turbine fuel module and for controlling the inlet fuel module and turbine fuel module to provide fuel for the at least one turbine.

2. The fuel conditioning system of claim 1, including a turbine fuel accessory module having a speed ratio valve and at least one fuel monitoring instrument, the fuel monitoring instrument being operable to activate the speed ratio valve in response to predetermined characteristics of the fuel exiting the turbine fuel module to shut off the supply of fuel to the turbine and the programmable logic controller collects data from the turbine fuel accessory module.

3. The fuel conditioning system of claim 1, wherein the inlet fuel module has an inlet metering station having an inlet flow meter to measure natural gas fuel flow from the pipeline.

4. The fuel conditioning system of claim 1, wherein the inlet pressure control station has an inlet pressure monitoring instrument and an inlet pressure regulator to reduce the pressure of the natural gas fuel.

5. The fuel conditioning system of claim 1, wherein the inlet scrubber station has an inlet vertical centrifugal scrubber with an inlet scrubber level control valve, the vertical centrifugal scrubber removing liquids from the natural gas fuel and the inlet scrubber level control valve releasing the removed liquids from the scrubber.

6. The fuel conditioning system of claim 1, wherein the inlet filter station has an inlet reverse flow coalescing filter and an inlet filter level control valve, the inlet reverse flow coalescing filter removing aerosols and particulates from the natural gas fuel and the inlet filter level control valve releasing the removed aerosols and particulates from the inlet reverse flow coalescing filter.

7. The fuel conditioning system of claim 1, wherein each turbine pressure control station has a turbine pressure monitoring instrument and a turbine pressure regulator, the turbine pressure control station controlling the pressure of the natural gas fuel and limiting changes in the pressure of the natural gas fuel.

8. The fuel conditioning system of claim 1, wherein each turbine super-heater station has at least one fuel monitoring instrument to determine the dew point of moisture in the fuel and the dew point of hydrocarbons in the fuel, a heater to heat the fuel above the dew point of the moisture and the dew point of the hydrocarbons found in the fuel gas, and heater control valves to control the temperature of the natural gas fuel and limit changes in the temperature of the natural gas fuel.

9. The fuel conditioning system of claim 1, wherein the inlet filter station includes a coalescing filter.

10. The fuel conditioning system of claim 1, wherein the turbine filter station includes a coalescing filter.

11. The fuel conditioning system of claim 1, wherein each turbine filter station has a turbine reverse flow coalescing filter and a turbine filter level control valve, the turbine reverse flow coalescing filter removing aerosols and particulates from the natural gas fuel and the turbine filter level control valve releasing the removed aerosols and particulates from the turbine reverse flow coalescing filter.

12. The fuel conditioning system of claim 1, including a trip transient mitigation system.

13. The fuel conditioning system of claim 1, wherein the turbine fuel module includes a latent fuel venting system.

14. The fuel conditioning system of claim 12, wherein the trip transient mitigation system has a surge vent valve activated by the programmable logic controller prior to the speed ratio valve being activated.

15. The fuel conditioning system of claim 2, wherein the at least one fuel monitoring instrument measures the pressure, the temperature, or the volume of the natural gas fuel and speed ratio valve cuts off the natural gas fuel supply to the turbine when the fuel monitoring instrument measures a pressure, temperature or volume outside of an acceptable range.

16. The fuel conditioning system of claim 2, further comprising a data recording device to record data from the inlet fuel module, the turbine fuel module, and the turbine fuel accessory module.

17. The fuel conditioning system of claim 2, further comprising a data transmitting device to transmit data from the inlet fuel module, the turbine fuel module, and the turbine fuel accessory module to a facility remote from the fuel conditioning system.

18. A fuel conditioning system for conditioning natural gas fuel provided by a pipeline for use with at least one natural gas fuel powered turbine, the fuel conditioning system comprising:

an inlet metering station having an inlet flow meter to measure natural gas fuel flow from the pipeline;

an inlet pressure control station having an inlet pressure monitoring instrument and an inlet pressure regulator, the inlet pressure regulator controlling the pressure of the natural gas fuel provided by the pipeline;

an inlet scrubber station having an inlet vertical centrifugal scrubber and an inlet scrubber level control valve, the vertical centrifugal scrubber removing liquids from the natural gas fuel provided by the pressurized pipeline and the inlet scrubber level control valve releasing the removed liquids from the scrubber;

an inlet filter station having an inlet filter and an inlet filter level control valve, the inlet flow filter removing aerosols and particulates from the natural gas fuel provided by the pressurized pipeline and the inlet filter level control valve releasing the removed aerosols and particulates from the inlet filter;

a turbine distribution system for receiving natural gas fuel which has passed though the inlet pressure control station, the inlet scrubber station and the inlet filter station;

at least one turbine pressure control station receiving natural gas fuel from the turbine distribution system, the turbine pressure control station having a turbine pressure monitoring instrument and a turbine pressure regulator, the turbine pressure regulator controlling the pressure of the natural gas fuel received and controlling pressure changes in the natural gas fuel received;

at least one turbine super-heater station receiving natural fuel gas from the turbine distribution system, the turbine super-heater station having turbine super-heater monitoring instruments to determine the dew point of the natural gas fuel and the dew point of hydrocarbons in the natural gas fuel, the super-heater station further having a heater to heat the natural gas fuel gas above the dew point of both moisture and hydrocarbons found in the natural gas fuel, and at least one heater control valve to limit changes in the temperature of the natural gas fuel;

at least one turbine filter station having a turbine filter and a turbine filter level control valve, the turbine filter removing aerosols and particulates from the natural gas fuel and the turbine filter level control valve releasing the removed aerosols and particulates from the turbine filter;

at least one trip transient mitigation system having a surge vent valve;

at least one turbine fuel accessory unit having fuel accessory unit monitoring instrument to measure the pressure, the temperature, or the volume of the fuel gas and a speed ratio valve, the fuel accessory unit monitoring instrument communicating with the speed ratio valve to close the speed ratio valve when the fuel accessory monitoring instrument measures a pressure, a temperature, or a volume outside of an acceptable range; and a programmable logic controller associated with and receiving data from the inlet flow meter, the inlet pressure monitoring instrument, the inlet scrubber level control valve, the inlet filter level control valve, the turbine pressure monitoring instrument, the turbine super-heater monitoring instrument, the turbine filter level control valve, and the fuel accessory monitoring instrument, the programmable logic controller also associated with, and providing control commands to, the inlet pressure regulator, the turbine pressure regulator, the heater, the heater control valve, and the surge vent, the control commands based upon the data received and control algorithms.

19. The fuel conditioning system of claim 18, wherein the programmable logic controller employs self-correcting control algorithms to adjust the inlet pressure regulator and the turbine pressure regulator to reduce pressure gradients at the turbine fuel accessory unit.

20. The fuel conditioning system of claim 18, wherein the programmable logic controller uses self-correcting algorithms to adjust the heater and heater control valves to reduce temperature gradients at the turbine fuel accessory unit.

21. The fuel conditioning system of claim 18, further comprising a latent fuel vent that releases treated fuel when a turbine is not running so that liquids do not form in the natural gas fuel as the fuel cools in a distribution system while a turbine is not running.

22. The fuel conditioning system of claim 21, wherein the natural gas fuel released from the latent fuel vent is captured and routed for use as a fuel for the heater.

23. The fuel conditioning system of claim 18, wherein the inlet filter includes a coalescing filter.

24. The fuel conditioning system of claim 18, wherein the turbine filter includes a reverse flow coalescing filter.

25. A fuel conditioning system for conditioning natural gas fuel provided by a pipeline to use with at least one natural gas fuel powered turbine, the conditioning system comprising:

a inlet fuel module having a flow meter, inlet pressure monitoring instrument, inlet pressure regulator, inlet centrifugal scrubber, and inlet coalescing filter, the inlet fuel conditioning module reducing the pressure of the fuel and removing impurities from the fuel;

a inlet distribution system transporting the fuel from the pipeline to the inlet fuel module;

a turbine fuel module for each of the at least one turbines, the turbine fuel module having a turbine pressure monitoring instrument, a turbine pressure regulator, a super-heater, and a turbine coalescing filter, the turbine fuel conditioning module controlling the pressure of the natural gas fuel, heating the natural gas fuel and removing impurities from the natural gas fuel;

a turbine distribution system transporting fuel from the inlet fuel conditioning module to at least one turbine fuel conditioning module; and a programmable logic controller for collecting data from the inlet fuel conditioning module and the turbine fuel conditioning module for use in controlling the inlet fuel module and turbine fuel module to provide fuel for each turbine.

* * * * *

UNITED STATES PATENT AND TRADEMARK OFFICE
CERTIFICATE OF CORRECTION

PATENT NO. : 6,901,735 B2
DATED : June 7, 2005
INVENTOR(S) : Paul Lohn

It is certified that error appears in the above-identified patent and that said Letters Patent is hereby corrected as shown below:

<u>Column 8,</u>
Line 65, replace "tuTtbine" with -- turbine --

<u>Column 10,</u>
Line 6, after "and", insert -- the --

Signed and Sealed this

Ninth Day of August, 2005

JON W. DUDAS
*Director of the United States Patent and Trademark Office*